(12) United States Patent
Huang et al.

(10) Patent No.: US 10,824,449 B2
(45) Date of Patent: Nov. 3, 2020

(54) APPLICATION RUNNING METHOD AND DEVICE

(71) Applicant: Tencent Technology (Shenzhen) Company Limited, Shenzhen (CN)

(72) Inventors: Yuanchao Huang, Shenzhen (CN); Hai Long, Shenzhen (CN); Zipeng Wu, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 10 days.

(21) Appl. No.: 16/298,096

(22) Filed: Mar. 11, 2019

(65) Prior Publication Data

US 2019/0205147 A1 Jul. 4, 2019

Related U.S. Application Data

(63) Continuation of application No. PCT/CN2017/105968, filed on Oct. 13, 2017.

(30) Foreign Application Priority Data

Oct. 25, 2016 (CN) .......................... 2016 1 09366243

(51) Int. Cl.
*G06F 9/451* (2018.01)
*G06F 3/0484* (2013.01)
(Continued)

(52) U.S. Cl.
CPC .............. *G06F 9/452* (2018.02); *G06F 3/0484* (2013.01); *G06F 3/1454* (2013.01); *G06F 9/54* (2013.01);
(Continued)

(58) Field of Classification Search
CPC ...... G06F 9/452; G06F 3/0484; G06F 3/1454; G06F 9/54; G06T 15/005; G09G 2340/02;
(Continued)

(56) References Cited

U.S. PATENT DOCUMENTS

| | | | |
|---|---|---|---|
| 8,793,235 B2 | 7/2014 | Burkard et al. | |
| 2007/0174429 A1* | 7/2007 | Mazzaferri | H04L 67/02 709/218 |

(Continued)

FOREIGN PATENT DOCUMENTS

| | | |
|---|---|---|
| CN | 102254292 A | 11/2011 |
| CN | 103561062 A | 2/2014 |

(Continued)

OTHER PUBLICATIONS

Office Action dated Dec. 31, 2019 for Chinese Application No. 201610936624.3 with concise English Translation, 11 pages.

(Continued)

*Primary Examiner* — Roland J Casillas
(74) *Attorney, Agent, or Firm* — Brinks Gilson & Lione

(57) ABSTRACT

Methods and devices for remote hosting of applications across operating system are disclosed. In particular, a second application may be launched and run remotely on a remote server running a first operating system, and the screen images of the second application may be rendered in a first application on a terminal device running a second operating system. In one implementation, a launching instruction may be sent by the terminal device through the first application to the remote server. The second application may then be launched in the remote server. Rendering parameters comprising API functions and API parameters may then be obtained in real-time during the running process of the second application. A rendering instruction containing the (Continued)

rendering parameters may then be sent to the first application in the terminal device for instructing the first application to render the screen images on the terminal device.

20 Claims, 10 Drawing Sheets

(51) Int. Cl.
 G06F 3/14 (2006.01)
 G06F 9/54 (2006.01)
 G06T 15/00 (2011.01)
(52) U.S. Cl.
 CPC ........ G06T 15/005 (2013.01); G09G 2340/02 (2013.01); G09G 2360/12 (2013.01); G09G 2370/022 (2013.01); G09G 2370/04 (2013.01)
(58) Field of Classification Search
 CPC ......... G09G 2360/12; G09G 2370/022; G09G 2370/04
 See application file for complete search history.

(56) References Cited

U.S. PATENT DOCUMENTS

2011/0115800 A1* 5/2011 Desai ..................... H04L 67/38
 345/501
2012/0226992 A1 9/2012 Clift et al.

FOREIGN PATENT DOCUMENTS

| CN | 103970534 A | 8/2014 |
| CN | 104881273 A | 9/2015 |
| CN | 105094872 A | 11/2015 |
| CN | 105677367 A | 6/2016 |
| CN | 105740029 A | 7/2016 |
| CN | 105760238 A | 7/2016 |

OTHER PUBLICATIONS

International Search Report and Written Opinion from corresponding international application No. PCT/CN2017/105968, 9 pgs., dated Jan. 19, 2018.
Office Action dated May 25, 2020 for Chinese Application No. 201610936624.3 with concise English Translation, 15 pages.

* cited by examiner

APPLICATION RUNNING METHOD AND DEVICE

RELATED APPLICATION

This application claims priority to International PCT Application No. PCT/CN2017/105968, entitled "Application Running Method and Device" filed with the Chinese Patent Office on Oct. 13, 2017, which claims priority to Chinese Patent Application No. 201610936624.3, entitled "Application Running Method and Device" filed with the Chinese Patent Office on Oct. 25, 2016, which are incorporated by reference in their entireties.

FIELD OF THE TECHNOLOGY

This application relates to the technical field of computers applications, in particular to a method and device for running application across operating systems.

BACKGROUND OF THE DISCLOSURE

With the development of computer technologies, the operating systems of terminals are increasingly diversified. For example, mobile phones can be installed with the Android™ (Android Operation System), IOS (iPhone Operation System or Apple personal computer operating system) and the like. Accordingly, developers of applications may need to develop different versions of the applications in accordance with different operating systems. Applications developed for a certain operating system can usually only run on terminals installed with that operating system and cannot run on the terminals installed with other operating systems. Usage of the applications is thus limited by the operating systems, and therefore, there is a need for a method that can run applications across operating systems.

SUMMARY

In order to solve the problems of the existing technology, the embodiment(s) of the present disclosure provides an application running method and device. The technical solution is as follows:

In one implementation, an application running method is provided and is applied to a server. The method includes the following steps:

receiving a running instruction sent by a terminal through a first application, the running instruction carrying a second application identifier;

running a second application based on the second application identifier;

obtaining rendering parameters in the running process of the second application according to the rendering process of a real-time screen image, the rendering parameters comprising an application program interface (API) and corresponding parameters called for rendering the real-time screen image; and sending a rendering instruction to the first application on the terminal, the rendering instruction carrying the rendering parameters and being used for instructing the first application on the terminal to render according to the rendering parameters.

In another implementation, an application running method is provided and is applied to a terminal. The method includes the following steps:

sending a running instruction to a server through a first application, the running instruction carrying a second application identifier;

receiving a rendering instruction sent by the server, the rendering instruction carrying rendering parameters, the rendering parameters comprising an application program interface (API) and corresponding parameters called by the server for rendering a real-time screen image in the running process of a second application, and the rendering instruction being used for instructing the first application to render according to the rendering parameters;

extracting the rendering parameters from the rendering instruction; and performing the rendering of the real-time screen image through the first application and the rendering parameters.

In another implementation, an application running device is provided. The application running device at least comprises a processor and a memory. The memory stores instructions which can be executed by the processor. When executing the instructions, the processor is configured to:

receive a running instruction sent by a terminal through a first application, the running instruction carrying a second application identifier;

run a second application based on the second application identifier;

obtain rendering parameters in the running process of the second application according to the rendering process of a real-time screen image, the rendering parameters comprising an application program interface (API) and corresponding parameters called for rendering the real-time screen image; and send a rendering instruction to the first application on the terminal, the rendering instruction carrying the rendering parameters and being used for instructing the first application on the terminal to render according to the rendering parameters.

In another implementation, an application running device is provided. The application running device at least comprises a processor and a memory. The memory stores instructions which can be executed by the processor. When executing the instructions, the processor is configured to:

send a running instruction to a server through a first application, the running instruction carrying a second application identifier;

receive a rendering instruction sent by the server, the rendering instruction carrying rendering parameters, the rendering parameters comprising an application program interface (API) and corresponding parameters called by the server for rendering a real-time screen image in the running process of a second application, and the rendering instruction being used for instructing the first application to render according to the rendering parameters;

extract the rendering parameters from the rendering instruction; and perform the rendering of the real-time screen image through the first application and the rendering parameters.

In another implementation, a non-volatile computer storage medium is provided and stores computer programs. The computer programs are used for executing the methods.

BRIEF DESCRIPTION OF THE DRAWINGS

The following briefly introduces the accompanying drawings for facilitating description of the various implementation of the present disclosure. Apparently, the accompanying drawings are merely examples of the present disclosure, and a person of ordinary skill in the art may still derive other drawings from these accompanying drawings without creative efforts.

DESCRIPTION OF EMBODIMENTS

The purpose, technical solutions and advantages of the present disclosure are described in detail using the implementations and in light of the accompanying diagrams below.

At present, in order to run an application across operating systems, a virtual machine may be provided with an operating system corresponding to the application and the virtual machine may be configured to run on top of the basis operating system of the terminal by utilizing a virtualization technology. As such, the application may run in the virtual machine and the virtual machines may run over a terminal base operating system.

This existing technology has at least the following problems:

A virtual machine need to be implemented on the terminal. Implementation of a virtual machine on the terminal consumes extra computing resources of the terminal and increase complexity of the terminal system. Such extra consumption of computing resources of the terminal may adversely affect the normal operation and performance of the terminal.

Figure 1:
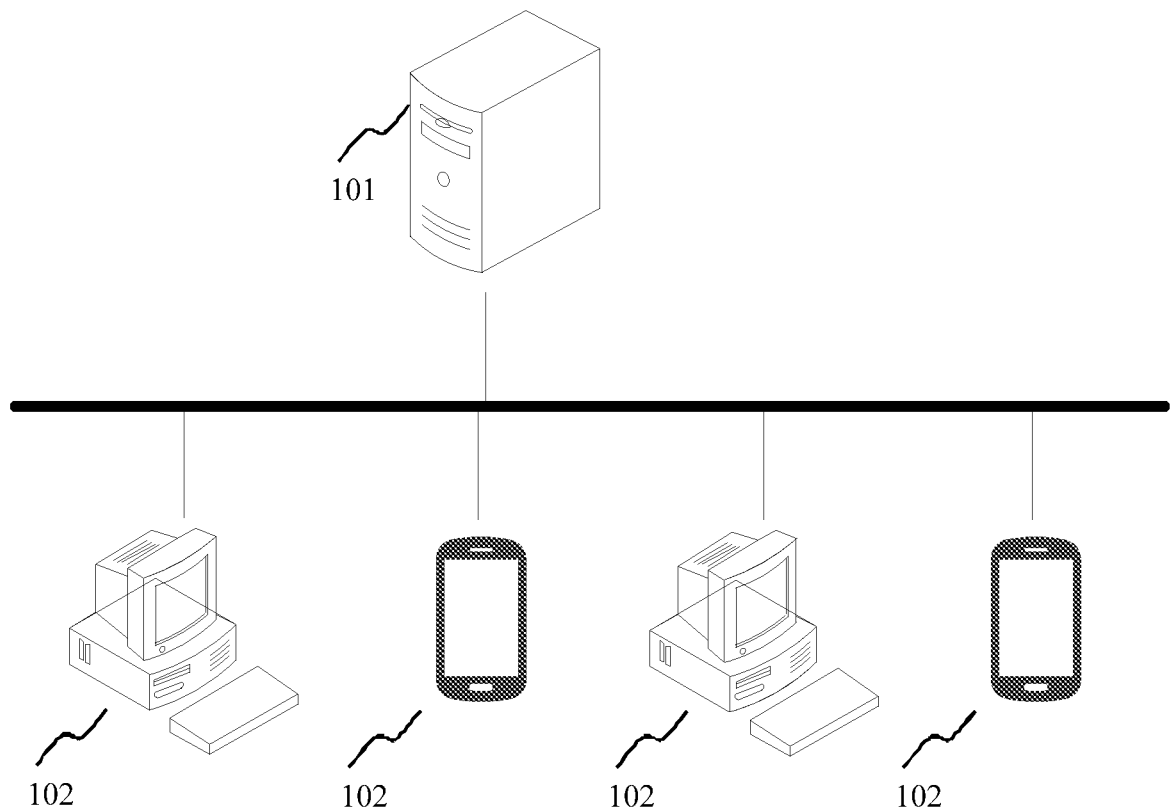
FIG. 1 is an implementing environment schematic diagram of an application running method provided by the embodiments of the present disclosure.

FIG. 1 is an environment schematic diagram for implementing an application running method. As shown in FIG. 1, the implementing environment comprises a server 101 and at least one terminal 102.

The server 101 can be a computer system disposed in a communication network for providing service to other machines (such as the terminal 102). The server 101 may be implemented as a server cluster comprising multiple centralized or distributed servers. Different operating systems may run on the multiple servers of the server cluster. Alternatively, multiple virtual machines can be configured to run on the server 101 (or server cluster 101) and different operating systems may be installed on the multiple virtual machines.

The terminal 102 may include but not limited to mobile phones or computers. An operating system may be installed on the terminal 102. For example, a mobile phone 102 may be installed with Android, IOS, or the like. A personal computer 102 may, for example, be installed with Windows Operating System, Unix operating system, or the like. Applications can also be installed on terminal 102. In some implementations, a first application may be installed on terminal 102. The first application may provide an access entry of at least one second application. The at least one second application does not need to be installed in terminal 102 and can be large scale computer games such as DOTA (Defense of the Ancients) and Need for Speed.

Figure 2:
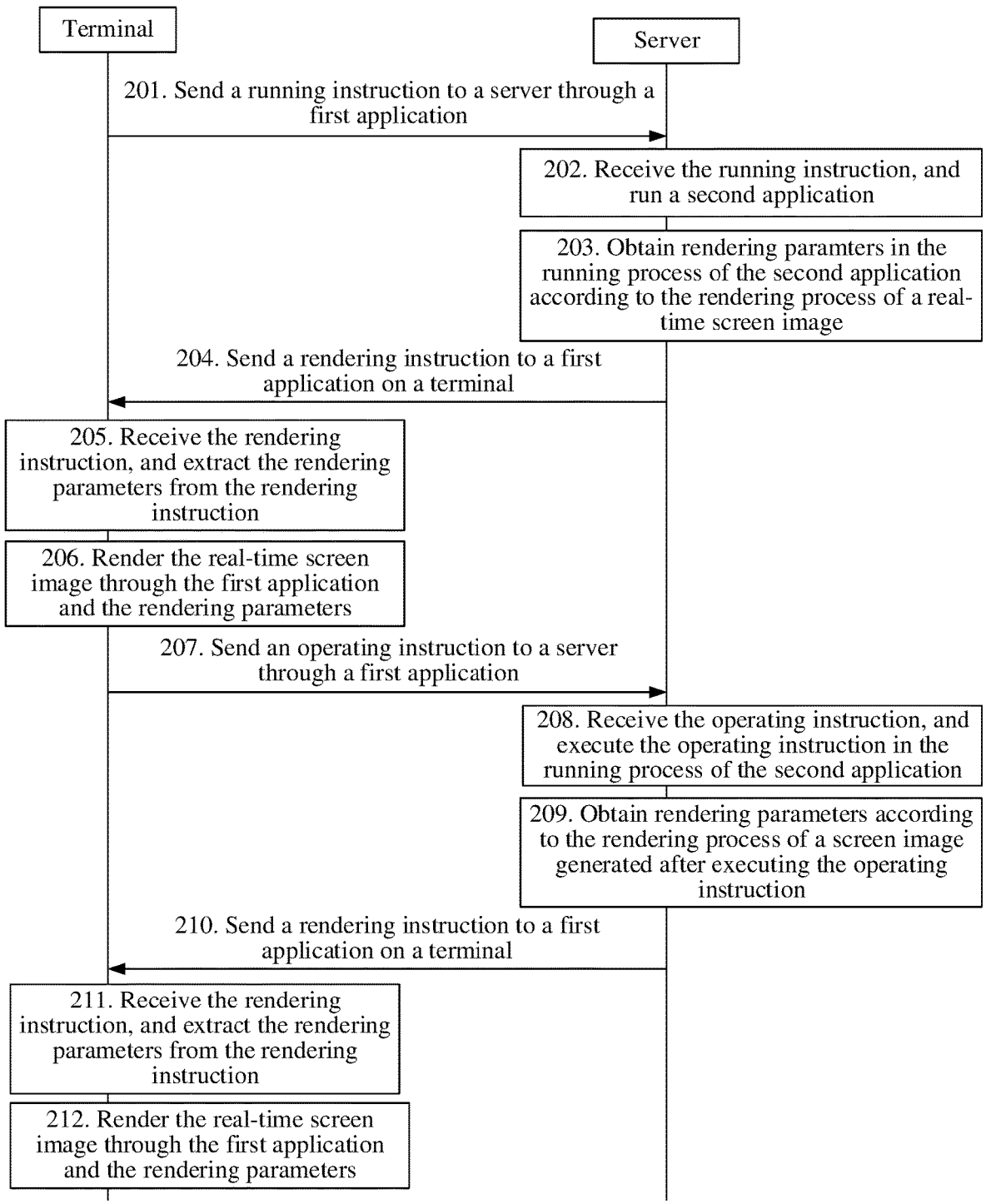
FIG. 2 is a flow diagram of an application running method provided by the embodiments of the present disclosure.

FIG. 2 is a flow diagram of a remote application running/execution method provided by the embodiments of the present disclosure. As shown in FIG. 2, the method includes the following steps:

Step 201: a terminal sends a starting (or launching) instruction to a server through a first application; and the starting instruction carries an identifier for a second application identifier.

Figure 3:
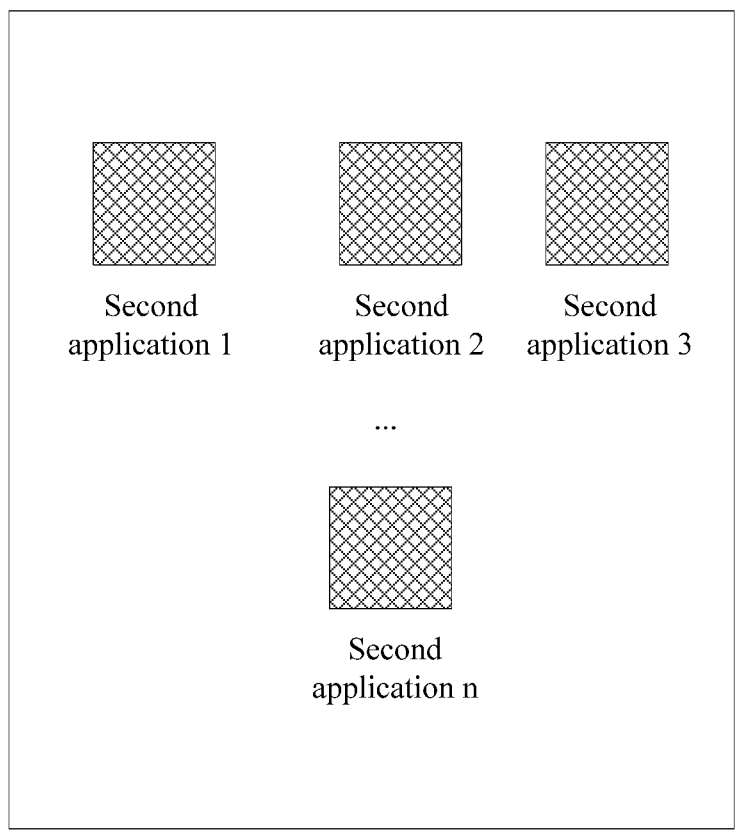
FIG. 3 is a schematic diagram of a user interface of a first application provided by the embodiments of the present disclosure.

The first application is installed on the terminal and can provide an access entry of at least one second application, and the at least one second application may not be installed on the terminal. A user can manually click the first application on the terminal; when the terminal detects the click operation, the first application is started or launched, and the user interface of the first application is displayed. As shown in FIG. 3, FIG. 3 is a schematic diagram of the user interface of the first application provided by the embodiments of the present disclosure. The user interface has icons of multiple second applications (the second application 1, the second application 2, the second application 3, . . . , and the second application n as shown in FIG. 3). The user can manually select icon of any second application. When the terminal detects the selection operation of one of the icons through the first application, the terminal sends an starting instruction to the server through the first application. As an example, the running method of a second application is described in the embodiments of the present disclosure by taking any one of the second applications provided by the first application.

In the embodiments of the present disclosure, the server provides service to the first application on the terminal, and also provides service to multiple second applications accessed via the first application. The second applications can be but are not limited to any of games, instructional management systems and the like.

Step 202: the server receives the starting instruction sent by the terminal through the first application and starts the second application based on the second application identifier.

The server can have different organizational structures, for example, the server can be configured as a member of a server cluster, and can also be configured as a centralized server. When the server receives the starting instruction carrying the second application identifier, the second application can be started and run by adopting the following two manners in accordance with the different server organizational structures above.

In the first manner, an operating system needed for the second application is determined according to the second application identifier. A target server running a matching operating system is determined or identified from the server cluster to which the server belongs; and the second application is started and runs on the target server.

The first manner is used when the server is configured as a member of the server cluster. The server cluster comprises multiple servers. Different operating systems may run on the multiple servers. Because the second application can only run in an operating system matching the operating system that the second application was developed for, the target server running the operating system required by the second application needs to be identified or determined from the multiple servers, so that the second application can be started and run on the target server.

For the second manner, the operating system needed by the second application is first determined according to the second application identifier. A target virtual machine running a matching operating system is identified from at least one virtual machines run by the server. The second application is then started and run on the target virtual machine running in the server.

The second manner is used when multiple virtual machines run on the server. Different operating systems are installed on the multiple virtual machines. Similar to the determination of the target server in the first manner, the target virtual machine running the operating system required by the second application needs to be determined or identified from the multiple virtual machines, so that the second application can be started and run on the target virtual machine.

The processes of sending the starting instruction by the terminal to the server and starting and running the second application on the server according to the starting instruction are described in step 201 and step 202 above. Step 203 below further describes how to present and render real-time screen image of the second application running on the server to a user on the terminal side.

Step 203: the server obtains rendering parameters needed for making function calls for rendering of real-time screen images during the running process of the second application on the server. The rendering parameters may comprise application program interface (API) functions (alternatively referred as "API") for image rendering and corresponding parameters of the API functions.

Figure 4:
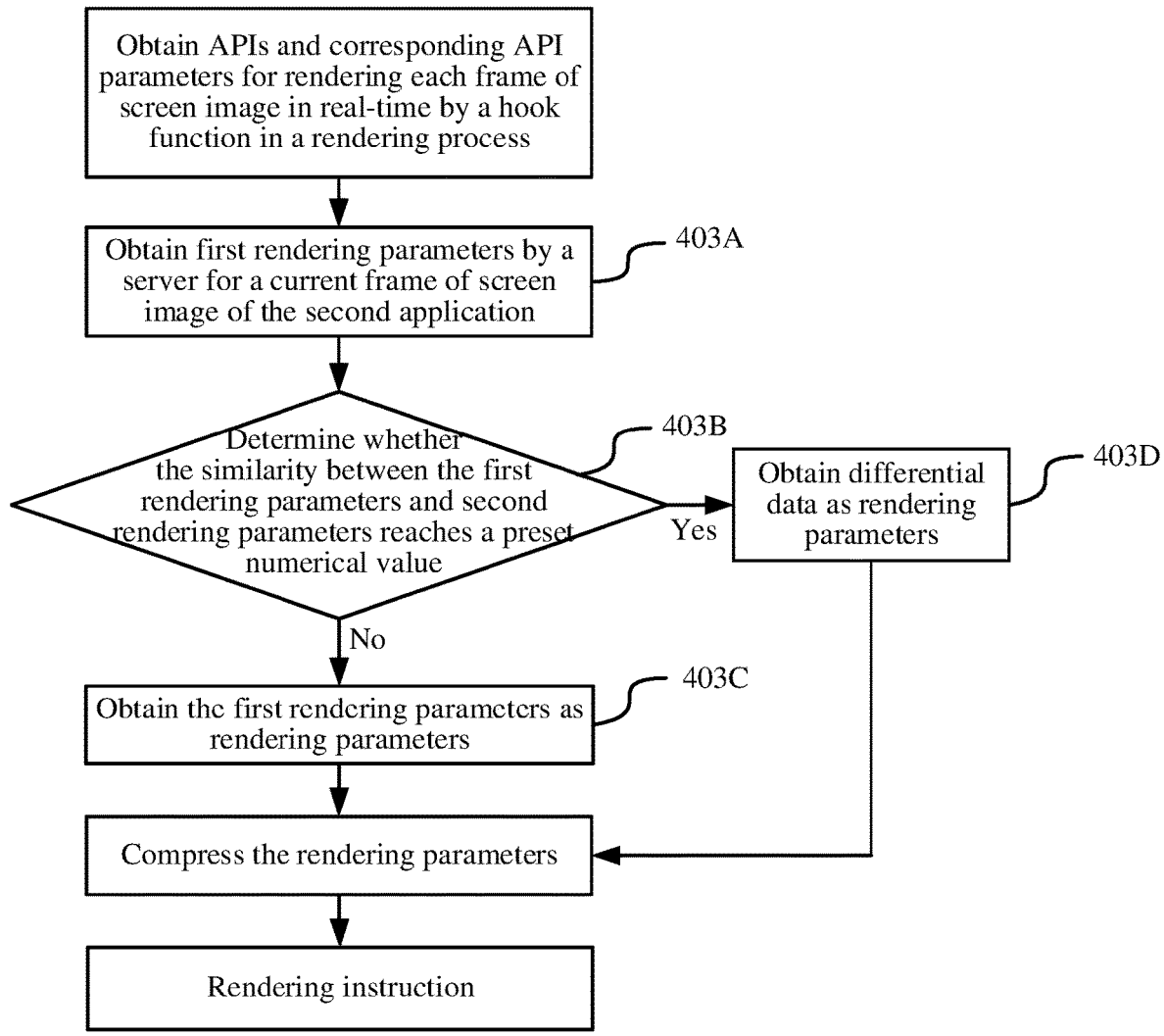
FIG. 4 is a flow diagram of generating a rendering instruction by a server.

The server renders each frame of screen image in real-time during the running process of the second application in the server. The API and the corresponding API parameters are called during rendering of each frame of the screen images. The server can obtain the API and corresponding API parameters called during the rendering of each frame in real-time according to the rendering process. As shown in FIG. 4, the server can capture or obtain the API and corresponding parameters for real-time rendering of screen images of the second application using a hook function. In some implementations, the API may include but is not limited to DirectX API, OpenGL API and the like.

For the rendering of each frame of screen image, multiple APIs and corresponding parameters may be needed. Each API may correspond to one or more parameters. The one or more APIs may be called in a sequence. For example, the second application may be a game, and when screen A1 presented in the running process of the game is rendered, API a11 and parameters m1 to mi, API a12 and parameters n1 to nj, . . . , API a1K and parameters q1 to qx and the like may be obtained by the hook function; and the sequence of calling the multiple APIs may be a11, a12, . . . , a1k.

In some implementations, the server can send the API and the corresponding parameters called during rendering of each screen image in real-time to the first application on the terminal. For example, for the current frame of the screen image presented in the running process of the second application, the server can send the API and the corresponding parameters called during rendering of the current frame of the screen image to the first application on the terminal.

The rendering parameters of the current frame of the screen image may share identical data with the rendering parameters of a previous frame of the screen image. Therefore, in order to reduce the transmission of data volume, for each frame of the screen image in the rendering process, as shown in FIG. 4, the rendering parameter of the current frame of the screen image can be obtained by the following steps 203A to 204D:

Step 203A: for the current frame of the screen image of the second application running on the server, the server obtains first rendering parameters; and the first rendering parameters comprises a first set of APIs and corresponding first parameters for rendering the current frame of the screen image.

For example, when the current frame of the screen image is A1, the server can determine and obtain API a11 and parameters m1 to mi, API a12 and parameters n1 to nj, . . . , API a1K and parameters q1 to qx and the like as first rendering parameters for rendering the current frame image of A1 by the hook function. The first set of APIs are a11, a12, . . . , and a1k, and the first parameters are m1 to mi, n1 to nj, . . . , and q1 to qx, and the API calling sequence is a11, a12, . . . , a1k.

Step 203B: whether the similarity between the first rendering parameter and a set of second rendering parameters reaches a preset numerical value (or preset threshold) is determined. Here, the second rendering parameters comprises a second set of APIs and corresponding second parameters for rendering a previous frame of the screen image. If the similarity does not reach the preset numerical value, step 203C may be performed. If the similarity reaches the preset numerical value, step 203D may be performed.

The determination of the similarity can be based on any calculation method. The preset numerical value or threshold can be predetermined by. The second rendering parameters may be obtained by the server by inquiring a local storage. For example, the server can maintain a database. The database can correspondingly store historical rendering parameters called when the server renders the real-time screen image according to frame numbers. For example, after the server renders the previous frame of screen image, the frame number of the previous frame and the second rendering parameter can be correspondingly stored in the database.

Corresponding to the example of the first rendering parameter in the step 203A, the second rendering parameter recorded in the database may, for example, comprise API a11 and parameters m1 to mi, API a12 and parameters n1 to nj, . . . , API a1h and parameters q1 to qy and the like. The second set of APIs comprises a11, a12, . . . , and a1h. The second parameters correspondingly comprise m1 to mi, n1 to nj, . . . , and q1 to qy. The sequence of calling the multiple APIs is a11, a12, . . . , a1h. As a difference between the second rendering parameters and the first rendering parameters, a1k and parameters q1 to qx are among the first rendering parameters but not among the second rendering parameters, whereas a1h and parameters q1 to qy are among the second rendering parameters but not among the first rendering parameters.

Step 203C: If the similarity does not reach the preset numerical value, the first rendering parameters are obtained for rendering the current frame of screen image.

If the similarity between the first rendering parameters and the second rendering parameters does not reach the preset numerical value, it shows that a difference between the current frame of the screen image and the previous frame of the screen image may be significant. For example, the game scene may have changed, causing the first rendering parameters to be significantly different from the second rendering parameters.

Step 203D: If the similarity reaches the preset numerical value, a differential rendering parameters between the first rendering parameters and the second rendering parameters are obtained for rendering the current frame of the screen image.

If the similarity between the first rendering parameters and the second rendering parameters reaches the preset numerical value, it shows that the current frame of the screen image is similar to the previous frame of the screen image. For example, when the user performs a simple action under the same game scene, the difference data between the first rendering parameters and the second rendering parameters are obtained. The difference data or differential rendering parameters can be obtained by any predetermined algorithm (such as diff algorithm) disclosure.

Corresponding to the example in the step 203B, the difference data may comprise the difference between a1k and parameters q1 to qx in the first rendering parameters and a1h and parameters q1 to qy in the second rendering parameters.

Step 204: the server sends a rendering instruction to the first application on the terminal. The rendering instruction may carry the rendering parameters and is used for instructing the first application on the terminal to render the current screen image on the server according to the rendering parameters.

After the server obtains the rendering parameters, the server can send the rendering parameters to the first application on the terminal via the rendering instruction.

The rendering parameters may be the first rendering parameters or differential rendering parameters according to step 203 above.

Based on the rendering parameters, different rendering instructions can be generated and sent, and the rendering instructions are sent under the following two conditions.

For the first condition, if the rendering parameters comprise the first rendering parameters, a first rendering instruction is sent to the terminal. The first rendering instruction is used for instructing the first application on the terminal to render the current frame of the screen image according to the first rendering parameters.

As the first rendering parameters comprises the first APIs and corresponding first parameters for rendering the current frame of the screen image, the first application on the terminal can render the current frame of the screen image directly according to the first rendering parameters.

For the second condition, if the rendering parameters comprise the differential rendering parameters, a second rendering instruction is sent to the terminal. The second rendering instruction is used for instructing the first application on the terminal to render the current frame of the screen image according to the differential rendering parameter and the second rendering parameters.

While the differential data is used for indicating the difference between the first rendering parameters and the second rendering parameters, the second rendering parameters have been stored in the terminal. The term differential data may be alternative referred to as differential parameters. Therefore, only the differential data need to be sent to the terminal. The terminal may combines the differential data and the second rendering parameters stored in the database to obtain the set of rendering parameters for rendering the current screen image, so that data transmission volume can be reduced.

The first rendering instruction and the second rendering instruction comprise rendering instructions generated according to different rendering parameters, and therefore, the first rendering instruction and the second rendering instruction may respectively carry a first identifier and a second identifier; and the terminal can identify the types of received rendering instructions through the identifiers.

In some implementations, in order to further reduce the volume of transmission of data, the server may further perform data compression processing on the rendering instructions before the rendering instructions are sent to the terminal. As such, the rendering instructions sent by the server may be subject to data compression processing and thus may need to be decompressed once received by the terminal.

Step 205: when the first application on the terminal receives the rendering instructions sent by the server, the rendering parameters are extracted from the rendering instructions. The rendering instructions may carry the rendering parameters. Tendering parameters may comprise a set of application program interface (API) and corresponding parameters to be called by the server for rendering screen image running one the server by the second application in real-time.

Figure 5:
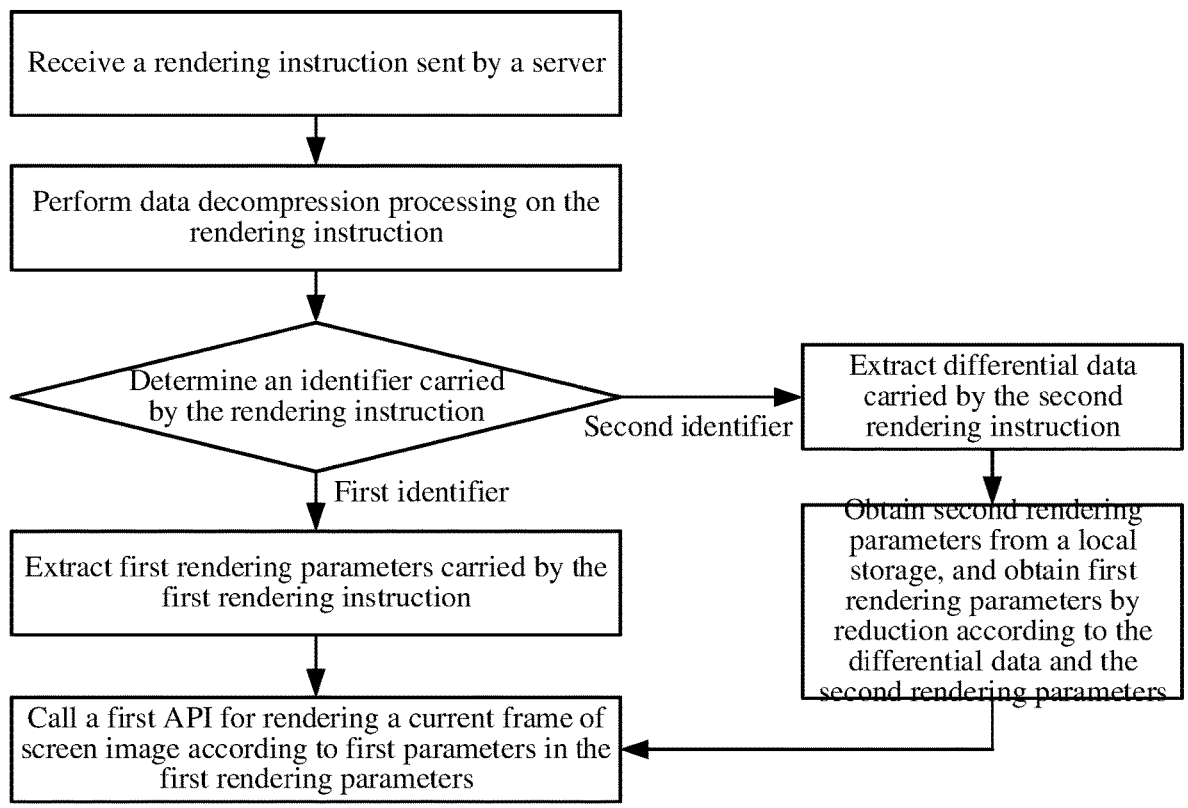
FIG. 5 is a flow diagram of processing the rendering instruction by a client.

As the rendering instructions sent by the server carry the rendering parameters, when the first application on the terminal receives the rendering instructions, the rendering parameters can be extracted from the rendering instructions. For example, corresponding to the description of the data compression processing of the rendering instructions in the step 204, if the rendering instructions are subject to data compression processing, the rendering instructions may correspondingly be subject to data decompression processing to obtain the rendering parameters, as shown in FIG. 5.

According to the description of the rendering instructions in the step 204, when the rendering instructions are received, identifiers carried by the rendering instructions are determined. If the rendering instruction carries a first identifier, the rendering instruction is determined to comprise the first rendering instruction. If the rendering instruction carries a second identifier, the rendering instruction is determined to comprise the second rendering instruction. As different rendering instructions carry different types of rendering parameters, different rendering parameters can be obtained by extracting from different rendering instructions. If the rendering instruction comprises the first rendering instruction, the first application may extract the first rendering parameters carried by the first rendering instruction, e.g., the first rendering instruction may be subject to data decompression processing to obtain the first rendering parameters. If the rendering instruction is the second rendering instruction, the first application may extract the differential parameters carried by the second rendering instruction, e.g., the second rendering instruction may be subject to data decompression processing to obtain the differential parameters, as shown in FIG. 5.

Step 206: the terminal renders the real-time screen image through the first application and based on the rendering parameters.

After the terminal extracts the rendering parameters, the rendering of the real-time screen image can be performed. For example, corresponding to the description of different types of rendering parameters in the step 205, the rendering of the real-time screen image can be performed the following different manners:

If the first rendering parameters are extracted, the first set of APIs in the first rendering parameters can be called, first API parameters in the first rendering parameters are transmitted to the first set of APIs, and the current frame of the screen image is rendered based on the first set of APIs.

For example, corresponding to the examples of the first APIs and the first parameters in the step 203A, a11 is called, and m1 to mi is transmitted to a11; a12 is called, and n1 to nj is transmitted to a12; and a1k is called, q1 to qx is transmitted to the a1k successively, and the current frame of the screen image is rendered.

Corresponding to differential rendering parameters, the second rendering parameters can be obtained from the local storage. The first rendering parameters may be derived according to the differential parameters and the second rendering parameters. The first APIs in the first rendering parameters are then called. The first parameters in the first rendering parameters are transmitted to the first APIs. The current frame of the screen image is rendered.

As the differential rendering parameters comprise differential data between the first rendering parameters and the second rendering parameters, the differential rendering parameters and the second rendering parameters can be combined to obtain the first rendering parameters.

Corresponding to the examples of the differential rendering parameters in the step 203D, a1h and parameters q1 to qy in the second rendering parameters can be changed to a1k and parameters q1 to qx, thereby obtaining the first rendering parameters.

The second rendering parameters can be obtained from the local storage. For example, the terminal may maintain a database. The database may correspondingly store historical rendering parameters according to frame numbers. For example, after the terminal renders the previous frame of the screen image, the frame number of the previous frame and the second rendering parameters can be correspondingly stored in the database. Similarly, in order to facilitate the rendering of the next frame of the screen image, after the current frame of the screen image is rendered, the frame number of the current frame and the first rendering parameters obtained either directly or by derivation can be correspondingly stored in the database.

Step 207: the terminal sends an operating instruction to the server through the first application. The operating instruction may carry a second application identifier.

In contrast to the operating instruction of step 207, the starting instruction in the step 201 for the second application is manually clicked and triggered by the user so as to instruct the server to start or launch the second application. The operating instruction is triggered through the manual action of the user so as to instruct the server to realize the specific effects desired by the user in the running process of the second application after the second application is started.

For example, the user can perform actions such as clicking and sliding on the running interface of the second application rendered and displayed on the terminal side. When the terminal detects the actions of the user through the first application, the operating instruction may be generated and sent to the server through the first application. The operating instruction carriers a second application identifier so as to instruct the server to realize the action effects desired by the user. When the second application is a game, the action effects can be control of the game characters, such as varying speed of vehicles and making a game character jump, and the like.

Both the operating instruction and the starting instruction can be referred to as running instructions. It shall be noted that the starting instruction is only used before the second application is started or launched, and the terminal sends the starting instruction to the server through the first application. After the second application is started or launched, the operating instruction may trigger the terminal to send a corresponding operating instruction to the server through the first application as long as the user performs any action on the running interface of the second application rendered on the terminal during the running process of the second application.

Step 208: the server receives the operating instruction sent by the terminal through the first application and executes the operating instruction in the running process of the second application based on the second application identifier.

The execution of the operating instruction comprises the analysis of the operating instruction and the execution of the operating instruction. Similar to step 202, when the server receives the operating instruction, the operating instruction is analyzed to derive a corresponding target instruction on the target server or the target virtual machine, and then the target instruction is executed so as to realize the action effects desired by the user. When the second application is a game, for example, the operating instruction is analyzed to derive a corresponding game instruction, and the game instruction is executed so as to, e.g., vary the speed of vehicles and generate jumping action of a game character, and the like.

Step 209: the server obtains rendering parameters according to the rendering process of the screen image generated after the operating instruction is executed.

The obtaining step of the rendering parameters is similar to the step 203. The rendering parameters comprise the APIs and corresponding API parameters for rendering the screen image generated after the server executes the operating instruction.

Step 210: the server sends the rendering instruction to the first application on the terminal; and the rendering instruction carriers the rendering parameters for instructing the first application on the terminal to render screen image according to the rendering parameters.

Step 211: when the first application on the terminal receives the rendering instruction sent by the server, the rendering parameters are extracted from the rendering instruction.

The step 210 to the step 211 is similar to the step 204 to the step 205.

Step 212: the terminal renders the real-time screen image through the first application and the rendering parameters.

The step 212 is similar to the step 206. The real-time screen image obtained by rendering process now comprises a screen image generated after the terminal sends the operating instruction to the server.

In the implementations above, sending of the operating instruction is described as being after the rendering instruction. These implementations are merely examples. In some other implementations, the operating instruction may be performed in parallel to or after the rendering instruction. It is possible that the server receives and respond to the operating instruction, so that the real-time screen image after response is rendered, and thus, the rendering instruction may carry the rendering parameters for screen image after the response.

Figure 6:
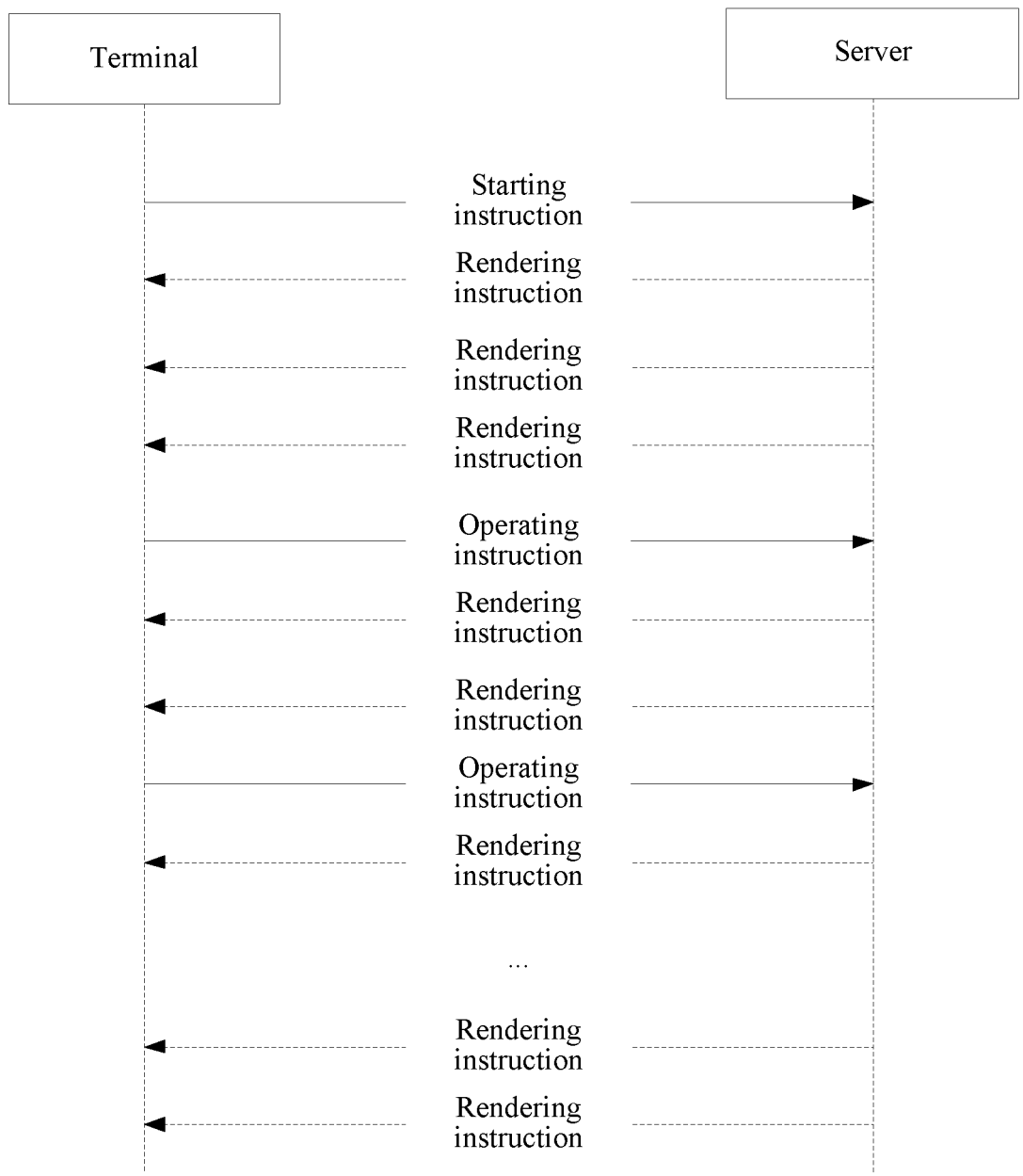
FIG. 6 is a schematic diagram of the interactive process of a terminal and the server.

FIG. 6 shows a schematic diagram of the interactive process of the terminal and the server. The operating instruction and the rendering instruction may be asynchronously sent, namely, the sending of the rendering instruction and the sending of the operating instruction may be independent. The rendering instruction may be sent by the server to the first application on the terminal in real time in the running process of the second application after the second application is started. The triggering of the rendering instruction sent to the terminal by the server is independent of when the server receives the operating instruction sent by the terminal. Namely, the triggering of the rendering instruction and the triggering of the operating instruction are asynchronous.

According to the method provided by the embodiments of the present disclosure, the second application runs on the server; the rendering parameter obtained by the server is sent to the first application running on the terminal in the form of the rendering instruction; and the first application renders screen image in the running process of the second application in real-time according to the rendering parameters. The second application runs on the server that provides an operating system needed by the second application; the computing resource consumption and requirement of the terminal is avoided; and the performance of the terminal is improved and can access applications that are not developed for the operating system running on the terminal.

In addition, only the transmission of the rendering instruction and the running instruction is needed between the terminal and the server, the transmission data volume is decreased, and therefore, burden on the communication network is reduced. For the current frame of screen image for the second application running on the server, the rendering parameter may be reduced to differential rendering parameter based on the similarity of the first rendering parameter and the second rendering parameter captured by the hook function, thereby further reducing the amount of date transmitted.

In order to more clearly explain the beneficial effects of the method provided by the implementations above, a further example from the perspective of the user and the second application developers is given below.

According to the method provided by the embodiments of the present disclosure, access entries points of multiple second applications may be provided through the first application. The multiple second applications run on the server rather than the terminal, thereby reducing computing resource consumption and requirement of the terminal. Only the running instruction and the rendering instruction is transmitted between the server and the terminal. Only the first application with the size of e.g., merely few megabytes needs to be installed on the terminal. Various functions and control of the second application can also be realized through the first application without heavy burden on the communication network.

In some implementations, the second application may be a large scale complex game. The user can play such large games having relatively high computing and display requirements from a ordinarily configured terminal.

According to the method provided by the embodiments of the present disclosure, as the second application runs on the server, the server only needs to provide an operating system needed by the running of the second application. Operating system installed in the terminal need not to match a particular second application. As such, the second applications can be run across various types of terminal installed with various operating systems. For example, the second application developed for an operating system installed on a first terminal (such as a mobile phone) can run on a second terminal (such as a computer terminal) installed with an incompatible operating system. When the second application is a game, a user can access games developed for mobile phone terminal on larger a computer terminal (e.g., a laptop computer or desktop computer), thereby solving the problems that a mobile phone terminal has poor operability and control accuracy when it comes to complex games.

According to the method provided by the embodiments of the present disclosure, as the second application runs on the server, the developers of the second application can neglect the problem of system compatibility for all development of the second application including upgrades, and only upgrade the application for certain system version, thereby greatly reducing the development and maintenance cost. As the upgrading process of the second application may only need to be performed on the server, the terminal side does not see the upgrading process. The influence of upgrading process on the normal operation of the terminal is avoided, reducing disturbance to the user of the terminal.

Figure 7:
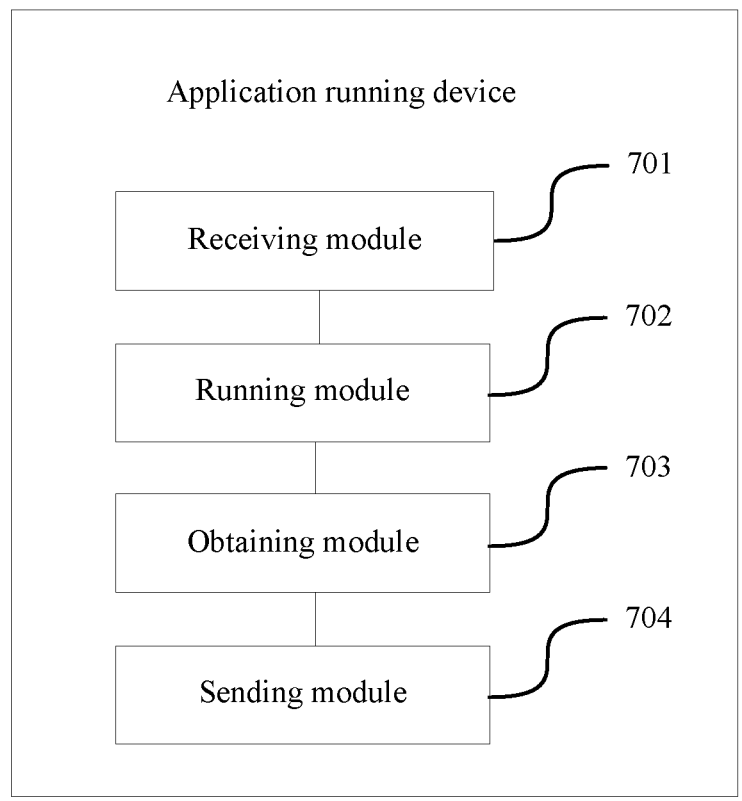
FIG. 7 is a structure schematic diagram of an application running device provided by the embodiments of the present disclosure.

FIG. 7 is a structure schematic diagram of an application running device provided by the embodiments of the present disclosure. By referring to FIG. 7, the device comprises:

a receiving module 701 being configured to receive a running instruction sent by the terminal through the first application, wherein the running instruction carries a second application identifier;

a running module 702 being configured to run the second application based on the second application identifier;

an obtaining module 703 being configured to obtain rendering parameters in the running process of the second application according to the rendering process of the real-time screen image, wherein the rendering parameters comprises an application program interface (API) and corresponding parameters called for rendering the real-time screen image; and a sending module 704 being configured to send a rendering instruction to the first application on the terminal, wherein the rendering instruction carries the rendering parameters and is used for instructing the first application to render according to the rendering parameters.

The obtaining module 703 is also configured to capture the API and corresponding parameters called during rendering each frame of screen image in the real-time screen image by a hook function in the running process of the second application.

Figure 8:
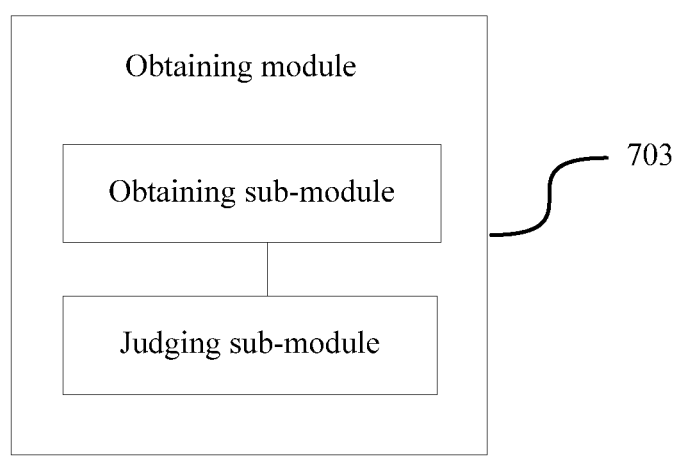
FIG. 8 is a structure schematic diagram of an obtaining module 703 provided by the embodiments of the present disclosure.

Referring to FIG. 8, FIG. 8 is a structure schematic diagram of an obtaining module 703 provided by the embodiments of the present disclosure; and the obtaining module 703 comprises:

an obtaining sub-module being configured to obtain first rendering parameters for the current frame of the screen image of the second application, wherein the first rendering parameters is the first API and corresponding first parameters called for rendering the current frame of the screen image; and a judgment sub-module being configured to determine whether the similarity between the first rendering parameters and second rendering parameters reaches a preset numerical value, wherein the second rendering parameters is the second API and corresponding second parameters called for rendering the previous frame of the screen image;

the obtaining sub-module is also configured to obtain the first rendering parameters as the rendering parameters if the similarity does not reach the preset numerical value; and the obtaining sub-module is also configured to obtain differential parameters between the first rendering parameters and the second rendering parameters as rendering parameters if the similarity reaches the preset numerical value.

The sending module 704 is configured to send a first rendering instruction to the terminal if the rendering parameters is the first rendering parameters, wherein the first rendering instruction is used for instructing the first application on the terminal to render the current frame of the screen image according to the first rendering parameters;

the sending module 704 is also configured to send a second rendering instruction to the terminal if the rendering parameters is the differential parameters, wherein the second rendering instruction is used for instructing the first application on the terminal to render the current frame of the screen image according to the differential parameters and the second rendering parameters.

The running module 702 is also configured to determine an operating system needed by the second application according to the second application identifier, determine a target server running the operating system from a server cluster in which the server is located according to the operating system, and run the second application on the target server; or the running module 702 is also configured to determine an operating system needed by the second application according to the second application identifier, determine a target virtual machine running the operating system from at least one virtual machine run by the server according to the operating system, and run the second application on the target virtual machine.

The running instruction is a starting instruction or an operating instruction.

The rendering instruction is an instruction subject to data compression processing.

According to the method provided by the embodiments of the present disclosure, the second application runs on the server; the obtained rendering parameters is sent to the first application on the terminal in the form of the rendering instruction; and the first application renders the real-time screen image in the running process of the second application according to the rendering parameters. The second application runs on the server providing the operating system needed by the second application; the consumption of computing resources of the terminal is avoided; and the performance of the terminal is ensured under the condition of meeting the requirement of the second application running across the operating systems.

In addition, the server only needs to send a rendering instruction to the terminal, the transmission data volume is small, and therefore, the requirements on network performance are low. For the current frame of screen image in the real-time screen image, according to the similarity of the first rendering parameters and the second rendering parameters which is obtained by the hook function, corresponding rendering parameters is obtained, and corresponding rendering instructions are generated, and further the transmission of data volume is reduced.

Figure 9:
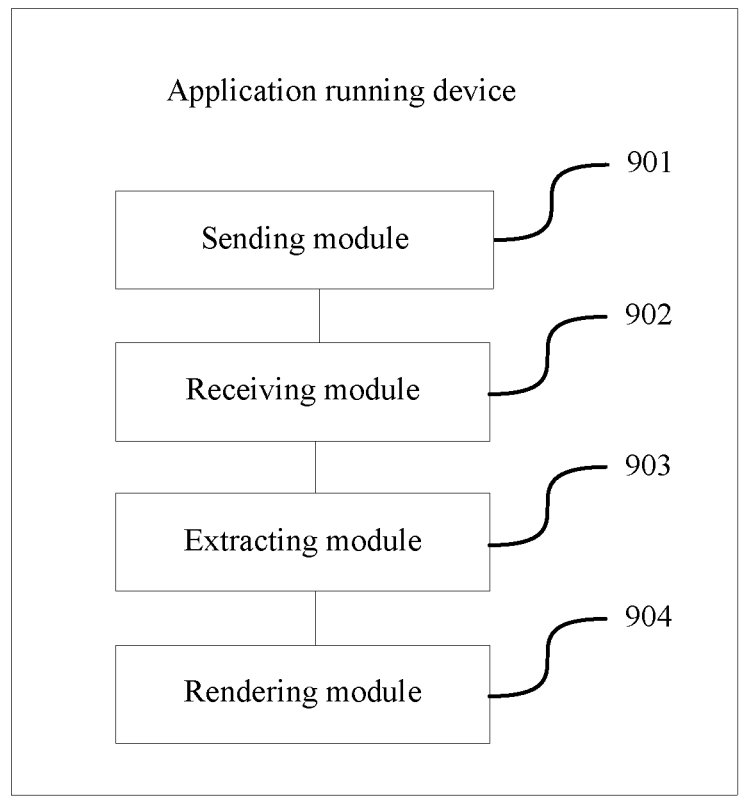
FIG. 9 is a structure schematic diagram of an application running device provided by the embodiments of the present disclosure.

FIG. 9 is a structure schematic diagram of an application running device provided by the embodiments of the present disclosure. Referring to FIG. 9, the device comprises:

a sending module 901 being configured to send a running instruction to the server through the first application, wherein the running instruction carries a second application identifier;

a receiving module 902 being configured to receive a rendering instruction sent by the server, wherein the rendering instruction carries rendering parameters; the rendering parameters comprises an application program interface (API) and corresponding parameters called for rendering the real-time screen image in the running process of the second application; and the rendering instruction is used for instructing the first application on the terminal to render according to the rendering parameters;

an extracting module 903 being configured to extract the rendering parameters from the rendering instruction; and a rendering module 904 being configured to render the real-time screen image through the first application the rendering parameters.

The rendering module 904 is also configured to extract the first rendering parameters carried by the first rendering instruction through the first application, to call the first API in the first rendering parameters, to transmit first parameters in the first rendering parameters to the first API and to render the current frame of the screen image if the rendering instruction is the first rendering instruction; or the rendering module 904 is also configured to extract the differential parameters carried by the second rendering instruction through the first application on the terminal, to obtain the second rendering parameters from the local storage, to obtain the first rendering parameters by reduction according to the differential parameters and the second rendering parameters, to call the first API in the first rendering parameters, to transmit first parameters in the first rendering parameters to the first API and to render the current frame of the screen image if the rendering instruction is the second rendering instruction;

the second rendering parameters is the second API and corresponding second parameters called for rendering the previous frame of the screen image; and the differential parameters is differential parameters between the first rendering parameters and the second rendering parameters.

The running instruction is a starting instruction or an operating instruction.

Figure 10:
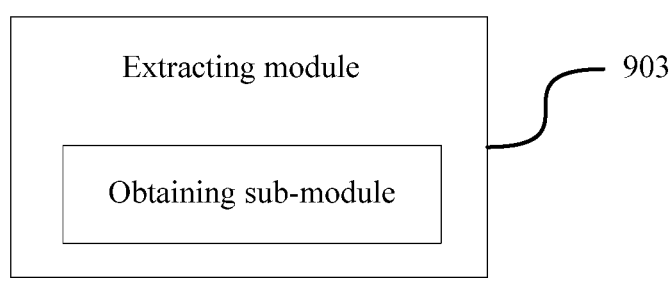
FIG. 10 is a structure schematic diagram of an extracting module 903 provided by the embodiments of the present disclosure.

Referring to FIG. 10, FIG. 10 is a structure schematic diagram of an extracting module 903 provided by the embodiments of the present disclosure; the extracting module 903 comprises:

a decompression sub-module being configured to perform data decompression processing on the rendering instruction to obtain the rendering parameters if the rendering instruction is an instruction subject to data compression processing.

It should be noted that the division of the above functional modules are only described for exemplary purposes. In some implementations, the functions may be allocated to different functional modules according to specific needs, which means that the internal structure of the apparatus is divided to different functional modules to complete all or part of the above described functions. In addition, the application running device and the application running method provided by the foregoing embodiments are based on the same concept. For the specific implementation process, refer to the embodiments of the method, and the descriptions thereof are omitted herein.

According to the method provided by the embodiments of the present disclosure, a running instruction is sent to the server; the second application is run by the server; the API is called to render the real-time screen image generated in the running process of the second application based on parameters in the rendering parameters according to the rendering parameters of the server in the running process of the second application; the second application runs on the server providing the operating system needed by the running of the second application; the consumption of the computing resources of the terminal is avoided; and the performance of the terminal is ensured under the condition of meeting the requirement of the second application running across the operating systems.

In addition, the terminal only needs to send a running instruction to the server, the transmission data volume is small, and the requirements on network performance are low.

Figure 11:
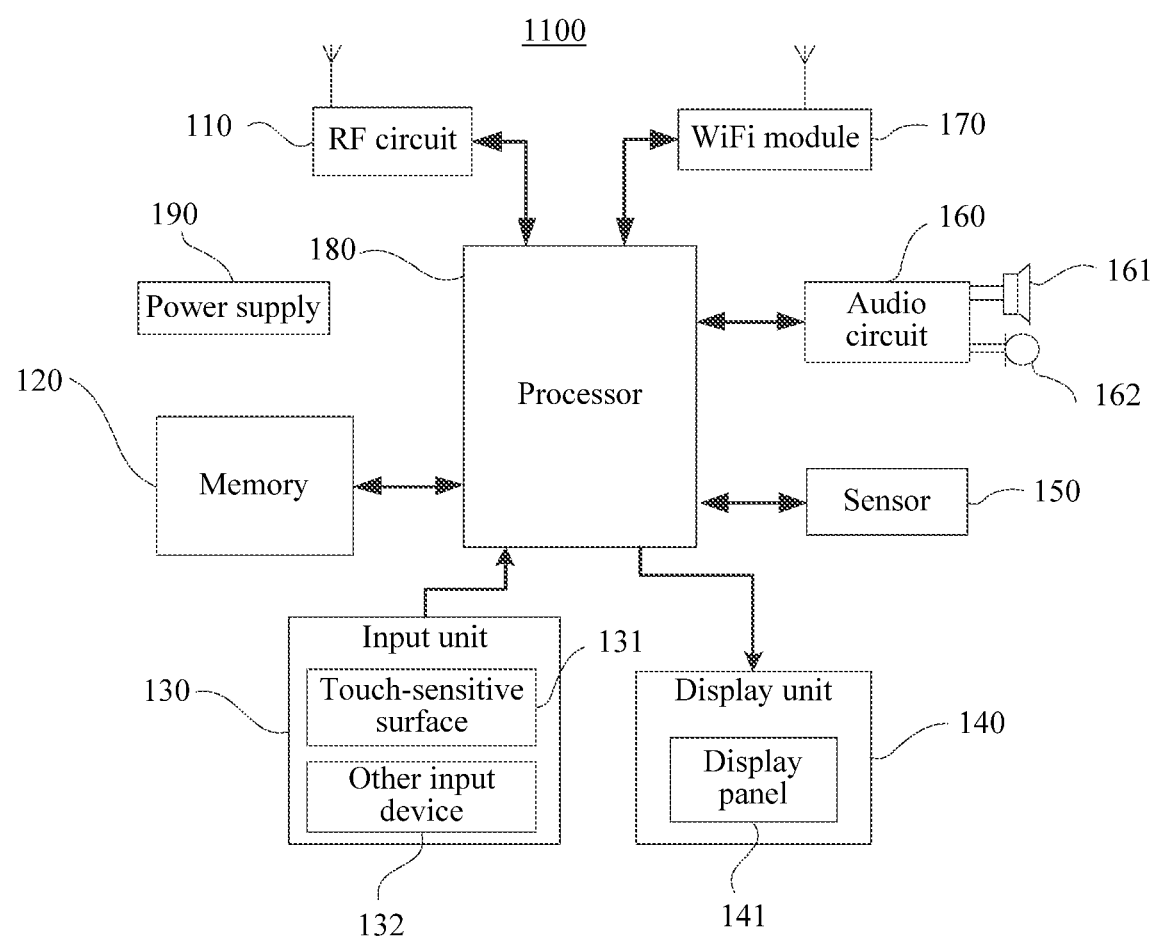
FIG. 11 is a structure schematic diagram of a terminal 1100 provided by the embodiments of the present disclosure.

The embodiment of the present disclosure provides a terminal. The terminal can be configured to execute an application running method provided by the foregoing embodiments. Referring to FIG. 11, FIG. 11 is a structure schematic diagram of a terminal 1100 provided by the embodiments of the present disclosure; and the terminal 1100 may include:

components such as a RF (Radio Frequency) circuit 110, a memory 120 including one or more computer readable storage media, an input unit 130, a display unit 140, a sensor 150, an audio circuit 160, a WiFi (Wireless Fidelity) module 170, a processor 180 including one or more processing cores, and a power supply 190. A person of ordinary skill in the art understands that the structure of the terminal shown in FIG. 11 does not constitute a limitation to the terminal, and the terminal may include more components or fewer components than those shown in the figure, or some components may be combined, or a different component deployment may be used.

The RF circuit 110 may be configured to receive and send signals during an information receiving and sending process or a call process. Particularly, the RF circuit 110 receives downlink information from a base station, then delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and other devices by wireless communication. The wireless communication may use any communications standard or protocol, which includes, but is not limited to, Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module. The processor 180 runs the software program and module stored in the memory 120, so as to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 1100, and the like. In addition, the memory 120 may include a high speed random access memory, and may also include a non-volatile memory, such as at least one magnetic disk storage device, a flash memory, or other non-volatile solid-state storage devices. Correspondingly, the memory 120 may further include a memory controller, so as to provide access of the processor 180 and the input unit 130 to the memory 120.

The input unit 130 may be configured to receive input digit or character information, and generate a keyboard, mouse, joystick, optical or track ball signal input related to the user setting and function control. Specifically, the input unit 130 may include a touch-sensitive surface 131 and other input devices 132. The touch-sensitive surface 131, which may also be referred to as a touch screen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. The touch-sensitive surface 131 may include two parts: a touch detection apparatus and a touch controller. The touch detection apparatus detects a touch position of the user, detects a signal brought by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute an instruction sent from the processor 180. In addition, the touch-sensitive surface 131 may be a resistive, capacitive, infrared or surface sound wave type touch-sensitive surface. In addition to the touch-sensitive surface 131, the input unit 130 may further include other input devices 132. Specifically, the other input devices 132 may include, but are not limited to, one or more of a physical keyboard, a functional key (such as a volume control key or a switch key), a track ball, a mouse, and a joystick.

The display unit 140 may be configured to display information input by the user or information provided for the user, and various graphic user interfaces of the terminal 1100. The graphic user interfaces may be formed by a graph, a text, an icon, a video, or any combination thereof. The display unit 140 may include a display panel 141, which may be configured by adopting the form of a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 11, the touch-sensitive surface 131 and the display panel 141 are used as two separate parts to implement input and output functions, in some embodiments, the touch-sensitive surface 131 and the display panel 141 may be integrated to implement the input and output functions.

The terminal 1100 may further include at least one sensor 150, such as an optical sensor, a motion sensor, and other sensors. Specifically, the optical sensor may include an ambient light sensor and a proximity sensor. The ambient light sensor can adjust luminance of the display panel 141 according to brightness of the ambient light. The proximity sensor may switch off the display panel 141 and/or backlight when the terminal 1100 is moved to the ear. As one type of motion sensor, a gravity acceleration sensor can detect magnitude of accelerations in various directions (generally on three axes), may detect magnitude and a direction of the gravity when in static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, may also be configured in the terminal 1100, and the descriptions thereof are omitted herein.

The audio circuit 160, a loudspeaker 161, and a microphone 162 may provide audio interfaces between the user and the terminal 1100. The audio circuit 160 may transmit a received electric signal, which is converted by audio data, to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1100.

WiFi is a short distance wireless transmission technology. The terminal 1100 may help, by using the WiFi module 170, the user to receive and send e-mails, browse a webpage, access streaming media, and so on, which provides wireless broadband Internet access for the user. Although FIG. 11 shows the WiFi module 170, it may be understood that the WiFi module 170 is not a necessary component of the terminal 1100, and when required, the WiFi module 170 may be omitted as long as the scope of the essence of the present disclosure is not changed.

The processor 180 is the control center of the terminal 1100, and is connected to various parts of the mobile phone by using various interfaces and lines. By running or executing the software program and/or module stored in the memory 120, and rendering parameters stored in the memory 120, the processor 180 performs various functions and data processing of the terminal 1100, thereby performing overall monitoring on the mobile phone. The processor 180 may include one or more processing cores. The processor 180 may integrate an application processor and a modem processor. The application processor mainly processes an operating system, a user interface, an application program, and the like. The modem processor mainly processes wireless communication. It may be understood that the foregoing modem processor may also not be integrated into the processor 180.

The terminal 1100 further includes the power supply 190 (such as a battery) for supplying power to the components. The power supply may be logically connected with the processor 180 by using a power management system, thereby implementing functions such as charging, discharging and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal 1100 may further include a camera, a Bluetooth module, and the like, which are not further described herein. Specifically, in the present embodiment, the display unit of the terminal is a touch screen display, and the terminal further includes a memory and one or more programs. The one or more programs are stored in the memory and configured to be executed by one or more processors. The one or more programs contain instructions used for executing the terminal side operation in the embodiment of the FIG. 2.

In an exemplary embodiment, a non-transitory computer readable storage medium including instructions, for example, a memory including instructions, is further provided. The instructions may be executed by a processor of a terminal to implement the application running method in the foregoing embodiments. For example, the non-transitory computer readable storage medium may be a read-only memory (ROM), a random access memory (RAM), a compact disc read-only memory (CD-ROM), a magnetic tape, a floppy disk, an optical data storage device, and the like.

Figure 12:
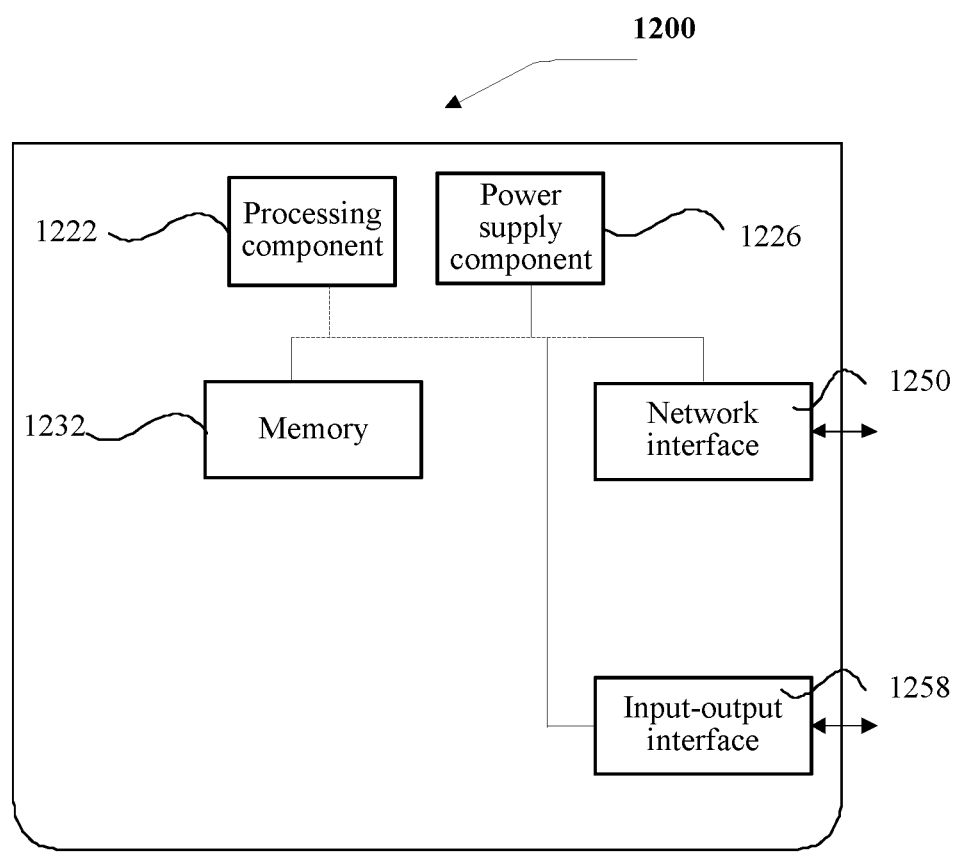
FIG. 12 is a block diagram of an application running device 1200 provided by the embodiments of the present disclosure.

FIG. 12 is a block diagram of an application running device 1200 provided by the embodiments of the present disclosure. For example, the device 1200 can be provided to serve as a server. Referring to FIG. 12, the device 1200 comprises a processing component 1222, further comprises one or more processors and memory resources represented by a memory 1232, and is used for storing instructions which can be executed by the processing component 1222, for example, an application program. The application program stored in the memory 1232 may include one or more modules, each of which corresponds to a group of instructions; and in addition, the processing component 1222 is configured to execute the instructions, so as to execute the foregoing application running method.

The device 1200 may also include a power supply component 1226 being configured to execute the power management of the device 1200, a wired or wireless network interface 1250 being configured to connect the device 1200 to the network, and an input-output (I/O) interface 1258. The device 1200 may operate operating systems stored in the memory 1232, for example, Windows Server™, Mac OS X™, Unix™, Linux™, FreeBSD™ or similar.

In an exemplary embodiment, a non-transitory computer readable storage medium including instructions, for example, a memory including instructions, is further provided. The instructions may be executed by a processor of a server to implement the application running method in the foregoing embodiments. For example, the non-transitory computer readable storage medium may be a read-only memory (ROM), a random access memory (RAM), a compact disc read-only memory (CD-ROM), a magnetic tape, a floppy disk, an optical data storage device, and the like.

A person of ordinary skill in the art may understand that all or part of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely examples not intended as limiting the present disclosure. Any modification, equivalent replacement, or improvement made within the spirit and principle of the present disclosure shall fall within the protection scope of the present disclosure.

What is claimed is:
1. A method for remote application hosting by a server comprising a processor, the method comprising:
    receiving a launching instruction sent by a terminal device through a first application running on a first operating system supported in the terminal device, wherein the launching instruction comprises an identifier for a second application;

launching the second application in the server in a second operating system supported by the server according to the identifier, wherein the second operating system is different from the first operating system;

obtaining rendering parameters for rendering a current frame of screen image of the second application in real-time while the second application is running on the server by:

obtaining first rendering parameters for the current frame;

obtaining second rendering parameters for a previous frame of the current frame;

determining whether a similarity between the first rendering parameters for the current frame and the second rendering parameters of the previous frame of the current frame reaches a preset threshold;

using the first rendering parameters as the rendering parameters for the current frame if the similarity does not reach the preset threshold; and using a differential rendering parameter between the first rendering parameters and the second rendering parameters as the rendering parameters for the current frame if the similarity reach the preset threshold, wherein the rendering parameters comprise at least one application program interface (API) function and corresponding parameters for rendering the current frame of the screen image of the second application on the terminal device; and sending a rendering instruction to an access point of the first application running on the terminal device, wherein the rendering instruction comprises the rendering parameters and is used for instructing the first application running on the terminal device to render the current frame of the screen image of the second application according to the rendering parameters.

2. The method according to claim 1, wherein obtaining the rendering parameters for the current frame of the screen image comprises:

obtaining the at least one API function and the corresponding API parameters for rendering the current frame of the screen image in real-time using a hook function in a running process of the second application.

3. The method according to claim 1, wherein sending the rendering instruction to the access point of the first application on the terminal device comprises:

sending a rendering instruction of a first type to the terminal device if the rendering parameters comprise the first rendering parameters, the rendering instruction of the first type being used for instructing the first application on the terminal device to render the current frame of the screen images according to the first rendering parameters; and sending a rendering instruction of a second type to the terminal device if the rendering parameters comprises the differential rendering parameters, the rendering instruction of the second type being used for instructing the first application on the terminal device to render the current frame of the screen image according to the differential rendering parameters and the second rendering parameters.

4. The method according to claim 1, wherein launching the second application according to the identifier of the second application comprises:

determining the second operating system needed by the second application according to the identifier, identifying a target server running the second operating system as the server from a server cluster, and running the second application on the target server; or determining the second operating system needed by the second application according to the identifier, identifying a target virtual machine running the second operating system from at least one virtual machine running by the server, and running the second application on the target virtual machine.

5. The method according to claim 1, further comprising:

responding to an operating instruction to control the screen images of the second application on the server, wherein the operating instruction is generated by capturing, by the terminal device, user operation on rendered frame of screen images on by the first application.

6. The method according to claim 1, wherein the rendering instruction is an instruction which is subject to data compression processing.

7. A remote application running method implemented by a terminal device and comprising:

sending a launching instruction to a remote server through a first application running on a first operating system supported in the terminal device, the launching instruction comprises an identifier for a second application and causes the remote server to launch the second application on a second operating system running on the remote server, wherein the second operating system is different from the first operating system;

receiving a rendering instruction sent by the remote server, via a access point of the first application running on the terminal device, the rendering instruction carrying rendering parameters, wherein:

the rendering parameters comprise a first rendering parameters for a current frame of screen image of the second application when a similarity between the first rendering parameters and second rendering parameters of a previous frame of the current frame of the second application does not reach a preset threshold;

the rendering parameters comprise differential rendering parameters between the first rendering parameters and the second rendering parameters when the similarity between the first rendering parameters and the second rendering parameters reaches the preset threshold; and the rendering parameters comprise at least one application program interface (API) function and corresponding API parameters for rendering, on the terminal device in real-time, the current frame of the screen image of the second application running on the remote server;

extracting the rendering parameters from the rendering instruction; and rendering the current frame of the screen image in real-time through the first application and according to the rendering parameters.

8. The method according to claim 7, wherein rendering the current frame of the screen image comprises:

determining a type of the rendering instruction received from the remote server; and extracting the at least API function and the API parameters carried by the rendering instruction through the first application on the terminal if the rendering instruction is of a first type, invoking the at least one API functions in the rendering parameters in sequence, transmitting the API parameters to the at least one API functions, and rendering the current frame of the screen image on the terminal device; or extracting the differential rendering parameters carried by the rendering instruction through the first application if the rendering instruction is of a second type, obtaining second rendering parameters from a local storage, combining the differential rendering parameters and the second rendering parameters to obtain the at least one API function and the API parameters, invoking the at least one API functions, transmitting the API parameters to the at least one API function, and rendering the current frame of the screen image on the terminal device.

9. The method according to claim 7, further comprising:
capturing user operation on the rendered frame of the screen images on the terminal device;
generating an operating instruction; and
transmitting the operating instruction to the remote server by the first application to control screen images by the second application running on the remote server.

10. The method according to claim 7, wherein extracting the rendering parameters from the rendering instruction further comprises:
determining whether the rendering instruction is compressed; and
decompressing the rendering instruction to obtain the rendering parameters if it is determined that the rendering instruction is compressed.

11. A remote application hosting device, comprising a processor and a memory, wherein the memory stores instructions, and wherein the processor, when executing the instructions, is configured to:
receive a launching instruction sent by a terminal device through a first application running on a first operating system supported in the terminal device, wherein the launching instruction comprises an identifier for a second application;
launch a second application in the remote application hosting device in a second operating system supported by the remote application hosting device according to the identifier, wherein the second operating system is different from the first operating system;
obtain rendering parameters for rendering a current frame of screen image of the second application in real-time while the second application is running on the remote application hosting device by:
obtaining first rendering parameters for the current frame;
obtaining second rendering parameters for a previous frame of the current frame;
determining whether a similarity between the first rendering parameters for the current frame and the second rendering parameters of the previous frame of the current frame reaches a preset threshold;
using the first rendering parameters as the rendering parameters for the current frame if the similarity does not reach the preset threshold; and
using a differential rendering parameter between the first rendering parameters and the second rendering parameters as the rendering parameters for the current frame if the similarity reach the preset threshold, wherein the rendering parameters comprise at least one application program interface (API) function and corresponding parameters for rendering the current frame of the screen image of the second application on the terminal device; and send a rendering instruction to an access point of the first application running on the terminal device, wherein the rendering instruction comprises the rendering parameters and is used for instructing the first application running on the terminal device to render the current frame of the screen image of the second application according to the rendering parameters.

12. The remote application hosting device according to claim 11, wherein processor, when executing the instructions to obtain the rendering parameter for the current frame of the screen image, is configured to obtain the at least one API function and the corresponding API parameters for rendering the current frame of the screen image in real-time using hook function in a running process of the second application.

13. The remote application hosting device according to claim 11, wherein the processor, when executing the instructions, to send the rendering instruction to the access point of the first application on the terminal device, is further configured to:
send a rendering instruction of a first type to the terminal if the rendering parameters comprise the first rendering parameters, the rendering instruction of the first type being used for instructing the first application on the terminal device to render a current frame of the screen images according to the first rendering parameters; and
send a rendering instruction of a second type to the terminal device if the rendering parameters comprise the differential rendering parameters, the rendering instruction of the second type being used for instructing the first application on the terminal to render a current frame of the screen image according to the differential rendering parameters and the second rendering parameters.

14. The remote application hosting device according to claim 11, wherein the processor, when executing the instructions to launch the second application, is further configured to:
determine the second operating system needed by the second application according to the identifier, identify a target server running the second operating system as the remote application hosting device from a server cluster, and run the second application on the target server; or
determine the second operating system needed by the second application according to the identifier, identify a target virtual machine running the second operating system from at least one virtual machines run by the remote application hosting device, and run the second application on the target virtual machine.

15. The remote application hosting device according to claim 11, the processor, when executing the instructions, is further configured to:
respond to an operating instruction to control the screen images of the second application on the remote application hosting device, wherein the operating instruction is generated by capturing, by the terminal device, user operation on rendered frame of screen images on by the first application.

16. The remote application hosting device according to claim 11, wherein the rendering instruction is an instruction subject to data compression processing.

17. An application running device, comprising a processor and a memory, wherein the memory stores instructions, and wherein the processor, when executing the instructions, is configured to:

send a launching instruction to a remote server through a first application running on a first operating system supported in the application running device, the launching instruction comprises an identifier for a second application and causes the remote server to launch the second application on a second operating system running on the remote server, wherein the second operating system is different from the first operating system;

receive a rendering instruction sent by the remote server, via a access point of the first application running on the application running device, the rendering instruction carrying rendering parameters, wherein:

the rendering parameters comprise a first rendering parameters for a current frame of screen image of the second application when a similarity between the first rendering parameters and second rendering parameters of a previous frame of the current frame of the second application does not reach a preset threshold;

the rendering parameters comprise differential rendering parameters between the first rendering parameters and the second rendering parameters when the similarity between the first rendering parameters and the second rendering parameters reaches the preset threshold; and the rendering parameters comprise at least one application program interface (API) function and corresponding API parameters for rendering, on the application running device in real-time, the current frame of the screen image of the second application running on the remote server;

extract the rendering parameters from the rendering instruction; and render, the current frame of the screen image in real-time through the first application and according to the rendering parameters.

18. The application running device according to claim 17, wherein the processor, when executing the instructions to render, the current frame of the screen image, is further configured to:

determine a type of the rendering instruction received from the remote server; and extract the at least API function and the API parameters carried by the rendering instruction through the first application on the application running device if the rendering instruction is of a first type, invoke the at least one API functions in the rendering parameters in sequence, transmitting the API parameters to the at least one API functions, and render the current frame of the screen image on the application running device; or extract differential rendering parameters carried by the rendering instruction through the first application if the rendering instruction is of a second type, obtain second rendering parameters from a local storage, combine the differential rendering parameters and the second rendering parameters to obtain the at least one API function and the API parameters, invoke the at least one API functions, transmitting the API parameters to the at least one API function, and render the current frame of the screen image on the application running device.

19. The application running device according to claim 17, wherein the processor, when executing the instructions, is further configured to:

capture user operation on the rendered frame of the screen images on the application running device;

generate an operating instruction; and transmit the operating instruction to the remote server by the first application to control screen images by the second application running on the remote server.

20. The application running device according to claim 17, wherein the processor, when executing the instructions to extract the rendering parameters from the rendering instruction, is further configured to:

determine whether the rendering instruction is compressed; and decompress the rendering instruction to obtain the rendering parameters if it is determined that the rendering instruction is compressed.

* * * * *